US012594854B2

(12) United States Patent
Choi

(10) Patent No.: US 12,594,854 B2
(45) Date of Patent: Apr. 7, 2026

(54) BATTERY CONTROL SYSTEM, BATTERY CONTROL METHOD AND ELECTRIC VEHICLE

(71) Applicant: LG ENERGY SOLUTION, LTD.,
Seoul (KR)

(72) Inventor: Yean-Sik Choi, Daejeon (KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 667 days.

(21) Appl. No.: 18/007,671

(22) PCT Filed: Sep. 2, 2021

(86) PCT No.: PCT/KR2021/011894
§ 371 (c)(1),
(2) Date: Dec. 1, 2022

(87) PCT Pub. No.: WO2022/055180
PCT Pub. Date: Mar. 17, 2022

(65) Prior Publication Data
US 2023/0242006 A1     Aug. 3, 2023

(30) Foreign Application Priority Data

Sep. 14, 2020     (KR) ........................ 10-2020-0117918

(51) Int. Cl.
B60L 58/10          (2019.01)
B60L 1/00           (2006.01)
(52) U.S. Cl.
CPC ................. B60L 58/10 (2019.02); B60L 1/00
(2013.01); B60L 2240/545 (2013.01);
(Continued)

(58) Field of Classification Search
CPC ...... B60L 58/10; B60L 1/00; B60L 2240/545;
B60L 2240/547; B60L 2240/549;
(Continued)

(56) References Cited

U.S. PATENT DOCUMENTS 5,798,629 A      8/1998  Terauchi
5,869,951 A  *   2/1999  Takahashi ............. H02J 7/0013
                                                          324/426
(Continued)

FOREIGN PATENT DOCUMENTS

CN            207481819 U      6/2018
DE      10 2018 106 369 A1     9/2019
(Continued)

OTHER PUBLICATIONS

Office Action dated Nov. 6, 2023, issued in corresponding Japanese
Patent Application No. 2022-575254.
(Continued)

*Primary Examiner* — M Baye Diao
(74) *Attorney, Agent, or Firm* — Morgan, Lewis &
Bockius LLP

(57)          ABSTRACT

A battery control system according to the present disclosure
is for an electric vehicle including a vehicle controller
connected between a first node and a second node, a vehicle
communication unit operably coupled to the vehicle con-
troller, an electric motor connected between the second node
and a third node, and a battery pack connected between a
fourth node and the second node. The battery control system
provides a sub power path between the battery pack and the
vehicle controller prior to providing a main power path from
the battery pack to the electric motor, in response to receiv-
ing an ignition signal for the electric vehicle.

16 Claims, 3 Drawing Sheets

1

(52) U.S. Cl.
CPC ... *B60L 2240/547* (2013.01); *B60L 2240/549* (2013.01); *B60L 2250/10* (2013.01)

(58) Field of Classification Search
CPC .... B60L 2250/10; B60L 50/66; B60L 3/0046; B60L 3/12; B60L 2240/54; Y02T 10/70; Y02T 10/7072; Y02T 90/12; Y02T 90/16; Y02T 10/72; H04W 4/48; B60Y 2306/15; B60Y 2200/91; H04L 2012/40215
USPC ........................................................ 320/127
See application file for complete search history.

(56) References Cited

U.S. PATENT DOCUMENTS

| | | | | |
|---|---|---|---|---|
| 8,816,640 | B2 * | 8/2014 | Yokoura | H01M 10/4207 |
| | | | | 320/128 |
| 9,156,343 | B2 * | 10/2015 | Philippart | H02J 7/345 |
| 9,553,451 | B2 * | 1/2017 | Zacharchuk | H04H 20/00 |
| 9,908,429 | B2 | 3/2018 | Sato et al. | |
| 10,894,484 | B2 * | 1/2021 | Han | B60L 53/67 |
| 2013/0116875 | A1 | 5/2013 | Oh et al. | |
| 2016/0207415 | A1 | 7/2016 | Sato et al. | |
| 2017/0351561 | A1 | 12/2017 | Yamazoe et al. | |
| 2018/0115178 | A1 | 4/2018 | Moon et al. | |
| 2018/0194243 | A1 | 7/2018 | Cheng | |
| 2019/0252735 | A1 * | 8/2019 | Sung | H01M 10/486 |
| 2020/0086745 | A1 | 3/2020 | Kim | |
| 2021/0249885 | A1 | 8/2021 | Lim | |

FOREIGN PATENT DOCUMENTS

| | | | | | |
|---|---|---|---|---|---|
| EP | 2517922 | A2 | 10/2012 | | |
| JP | H8-336201 | A | 12/1996 | | |
| JP | 2002-354703 | A | 12/2002 | | |
| JP | 2007-283974 | A | 11/2007 | | |
| JP | 2015-061427 | A | 3/2015 | | |
| JP | 2015-123823 | A | 7/2015 | | |
| JP | 5780195 | B2 | 9/2015 | | |
| JP | 6107562 | B2 * | 4/2017 | ............. | B60L 58/21 |
| JP | 2018-129984 | A | 8/2018 | | |
| JP | 2018-160971 | A | 10/2018 | | |
| KR | 10-0559542 | B1 | 3/2006 | | |
| KR | 10-2012-0005729 | A | 1/2012 | | |
| KR | 10-2013-0130217 | A | 12/2013 | | |
| KR | 10-2018-0006187 | A | 1/2018 | | |
| KR | 10-2018-0045954 | A | 5/2018 | | |
| KR | 10-2019-0047792 | A | 5/2019 | | |
| KR | 10-2019-0105278 | A | 9/2019 | | |
| KR | 10-2109125 | B1 | 5/2020 | | |
| KR | 10-2020-0069764 | A | 6/2020 | | |
| WO | 2016/072002 | A1 | 5/2016 | | |
| WO | 2020/153637 | A1 | 7/2020 | | |

OTHER PUBLICATIONS

Extended European Search Report issued Nov. 24, 2023 for European Patent Application No. 21867046.1 (Note: KR 2012-0005729 A was in a prior IDS.).
International Search Report (with partial translation) and Written Opinion dated Jan. 3, 2022, for corresponding International Patent Application No. PCT/KR2021/011894.

* cited by examiner

BATTERY CONTROL SYSTEM, BATTERY CONTROL METHOD AND ELECTRIC VEHICLE

TECHNICAL FIELD

The present disclosure relates to battery control technology for driving an electric vehicle without an auxiliary battery.

The present application claims the benefit of Korean Patent Application No. 10-2020-0117918 filed on Sep. 14, 2020 with the Korean Intellectual Property Office, the disclosure of which is incorporated herein by reference in its entirety.

BACKGROUND ART

Recently, there has been a rapid increase in the demand for portable electronic products such as laptop computers, video cameras and mobile phones, and with the extensive development of electric vehicles (for example, electric scooters), accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus trey are gaining more attention than nickel-based batteries for their advantages that recharging can be done whenever it is convenient, the self-discharge rate is very low and the energy density is high.

An electric vehicle usually includes a vehicle controller, an electric motor, a switch, a battery pack and an auxiliary battery. The battery pack is used as a main power source for the electric motor, and the auxiliary battery is used as an auxiliary power source for each device (for example, the vehicle controller) in the electric vehicle except the electric motor. The vehicle controller always operates using the power from the auxiliary battery and turns on the switch to conduct a power path from the battery pack to the electric motor in response to an input ignition signal from a driver's user device.

The battery pack usually includes a plurality of unit cells having high energy density and excellent charge/discharge characteristics, such as lithium-ion cells. In contrast, the auxiliary battery primarily includes a lead acid battery, and the lead acid battery has lower energy density and poorer charge/discharge characteristics than the lithium-ion cell.

In particular, the auxiliary battery occupies a relatively large space in the electric vehicle, and its self-discharge feature easily puts it in a low voltage state, which becomes an obstacle to normal operation of the vehicle controller.

DISCLOSURE

Technical Problem

The present disclosure is designed to solve the above-described problem, and therefore the present disclosure is directed to providing a battery control system and a battery control method using a battery pack as a sole power source for an electric vehicle without an auxiliary battery.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A battery control system according to an aspect of the present disclosure is for an electric vehicle including a vehicle controller connected between a first node and a second node, a vehicle communication unit operably coupled to the vehicle controller, an electric motor connected between the second node and a third node, and a battery pack connected between a fourth node and the second node. The battery control system includes a battery communication unit configured to transmit a first request signal in response to receiving an ignition signal for the electric vehicle, a first switch connected between the first node and the fourth node, a second switch connected between the first node and the third node, and a battery controller configured to turn on the first switch to provide a sub power path between the battery pack and the vehicle controller, and transmit a notification signal including battery information of the battery pack, in response to receiving the first request signal, when both the first switch and the second switch are turned off. The battery communication unit is configured to transmit a second request signal including the battery information to the vehicle communication unit in response to receiving the notification signal.

The battery communication unit may be coupled to the vehicle communication unit through a near field communication channel.

The battery information may indicate at least one of a voltage, a temperature, or a state of charge of the battery pack at a point in time when the first request signal is received.

The battery communication unit may be configured to transmit a third request signal to the battery controller in response to receiving a confirmation signal from the vehicle communication unit after the second request signal is transmitted.

The battery controller may be configured to turn on the second switch to provide a main power path from the battery pack to the electric motor in response to receiving the third request signal.

The battery controller may be configured to detect a battery current flowing through the battery pack after the first switch is turned on.

The battery controller may be configured to transmit the notification signal to the vehicle communication unit when the battery current is within a predetermined threshold current range.

The battery controller may be configured to turn off the first switch when the battery current is outside of a predetermined threshold current range.

The battery controller may be configured to transmit an error signal to the battery communication unit when the battery current is outside of a predetermined threshold current range, the error signal indicating that an open circuit fault or a short circuit fault occurred in the sub power path.

An electric vehicle according to another aspect of the present disclosure includes the battery control system.

A battery control method according to still another aspect of the present disclosure is provided to be executable by the battery control system. The battery control method includes transmitting, by the battery communication unit, the first request signal in response to receiving the ignition signal for the electric vehicle, turning on, by the battery controller, the first switch to provide the sub power path between the battery pack and the vehicle controller in response to receiving the first request signal when both the first switch and the second switch are turned off, transmitting, by the battery controller, the notification signal after the first switch is turned on, and transmitting, by the battery communication unit, the second request signal to the vehicle communication unit in response to receiving the notification signal.

The battery control method may further include transmitting, by the battery communication unit, a third request signal to the battery controller in response to receiving a confirmation signal from the vehicle communication unit after the second request signal is transmitted, and turning on, by the battery controller, the second switch to provide a main power path from the battery pack to the electric motor in response to receiving the third request signal.

Advantageous Effects

According to at least one of the embodiments of the present disclosure, a battery pack may be used as a sole power source that supplies energy required for an electric vehicle without an auxiliary battery. Accordingly, it is possible to prevent ignition disable caused by the low voltage state of the auxiliary battery.

Additionally, it is possible to extend the available driving distance of the electric vehicle by expanding the capacity of the battery pack as much as the space occupied by the auxiliary battery in the electric vehicle.

Additionally, according to at least one of the embodiments of the present disclosure, on the condition that an ignition request is received from the driver, the sub power path between the battery pack and the vehicle controller may be provided, and then the main power path between the battery pack and the electric motor may be provided. Accordingly, it is possible to prevent unnecessary energy consumption of the battery pack due to the standby power of the vehicle controller and the electric motor.

Additionally, according to at least one of the embodiments of the present disclosure, it is possible to diagnose a fault in the sub power path based on the battery current flowing through the battery pack while the sub power path is put in conduction.

The effects of the present disclosure are not limited to the effects mentioned above, and these and other effects will be clearly understood by those skilled in the art from the appended claims.

BRIEF DESCRIPTION OF DRAWINGS

The accompanying drawings illustrate preferred embodiments of the present disclosure, and together with the detailed description of the present disclosure described below, serve to provide a further understanding of the technical aspects of the present disclosure, and thus the present disclosure should not be construed as being limited to the drawings.

MODES OF PRACTICING THE DISCLOSURE

Figure 1:
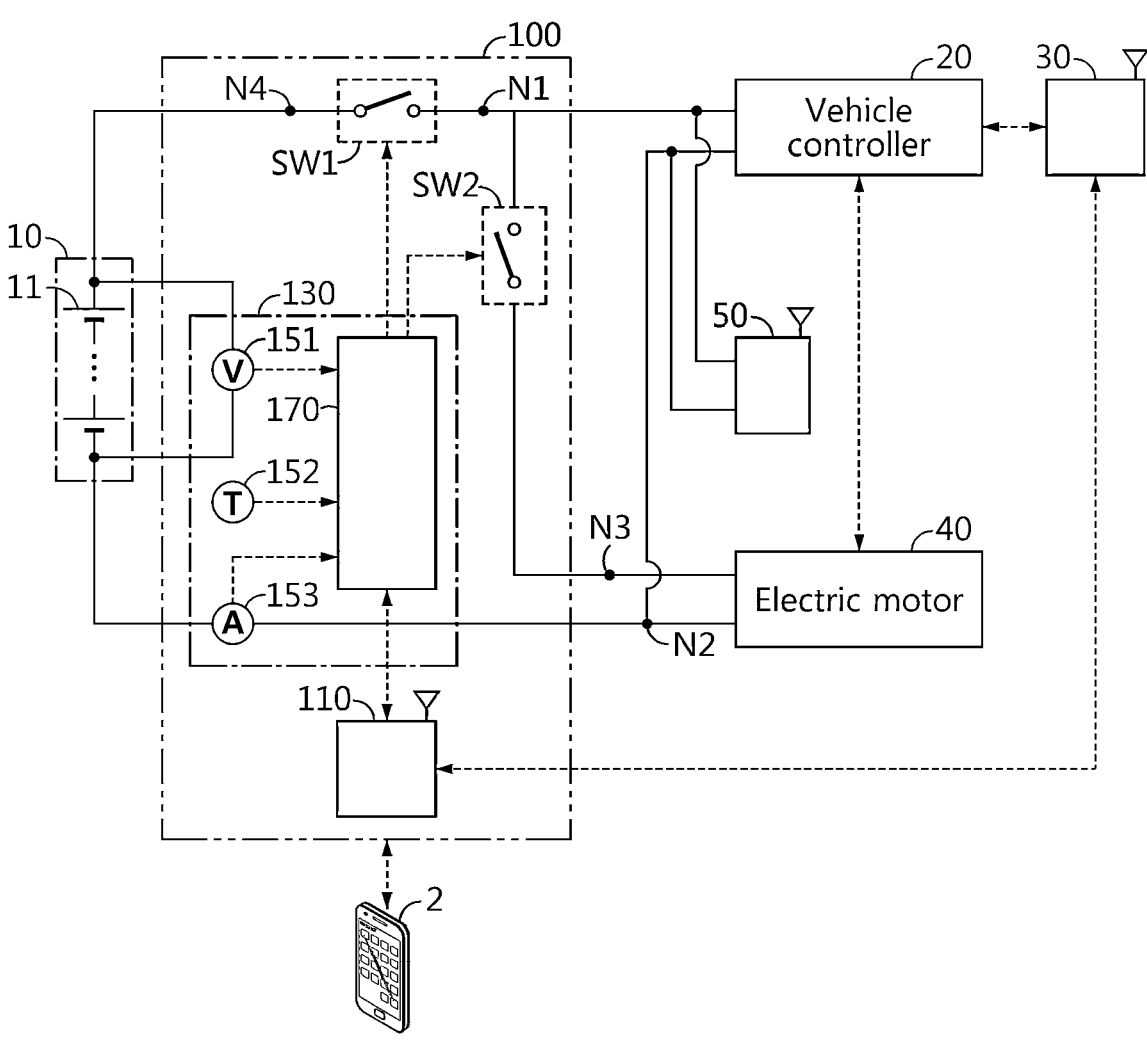
FIG. 1 illustrates by way of example a configuration of an electric vehicle including a battery control system according to the present disclosure.

Hereinafter, preferred embodiments of the present disclosure will be described in detail with reference to the accompanying drawings. Prior to the description, it should be understood that the terms or words used in the specification and the appended claims should not be construed as being limited to general and dictionary meanings, but rather should be interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term "control unit" refers to a processing unit of at least one function or operation, and this may be implemented by hardware and software either alone or in combination.

In addition, throughout the specification, it will be further understood that when an element is referred to as being "connected to" another element, it can be directly connected to the other element or intervening elements may be present.

FIG. 1 illustrates by way of example a configuration of an electric vehicle 1 including a battery control system 100 according to the present disclosure.

Referring to FIG. 1, the electric vehicle 1 includes a battery pack 10, a vehicle controller 20, a vehicle communication unit 30, an electric motor 40 and a battery control system 100. The electric vehicle 1 may further include a peripheral device 50. The peripheral device 50 may include, for example, a heater, an audio player, and a lighting of the electric vehicle 1.

The vehicle controller 20 is provided to control all of the electric motor 40 and the peripheral device 50. The vehicle controller 20 performs bidirectional communication with the battery control system 100 through the vehicle communication unit 30 during the operation. The vehicle controller 20 may include a converter for a voltage drop of the direct current power from the battery pack 10 down to the voltage level required for the operation of the vehicle controller 20.

The vehicle communication unit 30 is operably coupled to the vehicle controller 20. Operably coupled refers to directly/indirectly connected to transmit and receive a signal in one or two directions. The vehicle communication unit 30 is provided to transmit a signal, a command and/or a message from the vehicle controller 20 to the battery control system 100.

The electric motor 40 is operably coupled to the vehicle controller 20. The electric motor 40 adjusts the rotational speed, torque and/or rotation direction according to a command from the vehicle controller 20, to drive the electric vehicle 1 according to the driver's intention. The electric motor 40 may include an inverter to change the direct current power from the battery pack 10 to alternating current power.

The battery pack 10 is provided as a power source required for the operation of the vehicle controller 20 and the electric motor 40. The battery pack 10 may include a plurality of battery cells 11 connected in series. The battery cell 11 is not limited to a particular type and may include any battery cell that can be repeatedly recharged, for example, a lithium-ion cell.

The battery control system 100 includes a battery communication unit 110, a first switch SW1, a second switch SW2, and a battery controller 130.

The battery communication unit 110 is operably coupled to the battery controller 130. The battery communication unit 110 is provided to transmit a signal, command, and/or message from the battery controller 130 to the vehicle communication unit 30. The battery communication unit 110 and the vehicle communication unit 30 are provided to enable bidirectional communication via a wired network and/or a wireless network. The wired network may be, for example, a controller area network (CAN). The wireless network may be, near field communication (NFC), Zigbee and Bluetooth communication. For example, each of the battery communication unit 110 and the vehicle communication unit 30 has an NFC circuit, and they are connected to each other through a near field communication channel.

The first switch SW1 is operably coupled to the battery controller 130. The first switch SW1 is provided to selectively conduct a sub power path from the battery pack 10 to the vehicle controller 20 in response to a first switching signal from the battery controller 130.

The second switch SW2 is operably coupled to the battery controller 130. The second switch SW2 is provided to selectively conduct a main power path from the battery pack 10 to the electric motor 40 in response to a second switching signal from the battery controller 130.

The first switch SW1 and the second switch SW2 may include a well-known switching device such as a relay or a Field Effect Transistor (FET).

The battery controller 130 includes a voltage sensor 151 and a control unit 170. The battery controller 130 may further include a temperature sensor 152 and/or a current sensor 153.

The voltage sensor 151 is connected in parallel to the battery pack 10. The voltage sensor 151 is configured to detect a battery voltage across the battery pack 10 and generate a voltage signal indicating the detected battery voltage.

The temperature sensor 152 is positioned at a preset location within a predetermined distance from the battery pack 10. The temperature sensor 152 is configured to detect a battery temperature of the battery pack 10 and generate a temperature signal indicating the detected battery temperature.

The current sensor 153 is connected in series to the battery through a current path for the charge/discharge of the battery pack 10. The current sensor 153 is configured to detect a battery current flowing through the battery pack 10 and generate a current signal indicating the detected battery current.

The control unit 170 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors or electrical units for performing the other functions. The control unit 170 may include a memory device therein, and the memory device may include, for example, random access memory (RAM), read only memory (ROM), register, hard disc, optical recording media or magnetic recording media. The memory device may store, update and/or erase programs including a variety of control logic which is executed by the control unit 170 and/or data created when the control logic is executed.

The control unit 170 may determine a state of charge (SOC) and/or a state of health (SOH) of the battery pack 10 by repeatedly collecting the voltage signal, the temperature signal and/or the current signal at a predetermined time interval. Additionally, the control unit 170 may generate battery information indicating at least one of the voltage, temperature, current, SOC, or SOH of the battery pack 10. The SOC and SOH may be calculated by adopting the well-known methods, and its detailed description is omitted.

A plurality of nodes N1~N4 is provided within the electric vehicle 1. The 'node' as used herein refers to a location or area in which at least two electrical components are electrically coupled to each other.

The vehicle controller 20 is connected between a first node N1 and a second node N2. That is, the vehicle controller 20 is supplied with the power from the battery pack 10 through the first node N1 and the second node N2. The peripheral device 50 may be connected in parallel to the vehicle controller 20 between the first node N1 and the second node N2.

The electric motor 40 is connected between the second node N2 and a third node N3. That is, the electric motor 40 is supplied with the power from the battery pack 10 through the second node N2 and the third node N3.

The first switch SW1 is connected between the first node N1 and a fourth node N4. The battery pack 10 is connected between the fourth node N4 and the second node N2. The second switch SW2 is connected between the first node N1 and the third node N3.

When the first switch SW1 is turned on, the sub power path is put into conduction. The sub power path may be a closed loop passing through the battery pack 10, the first switch SW1, the first node N1, the vehicle controller 20, and the second node N2. When the sub power path is put into conduction, the power is supplied from the battery pack 10 to the vehicle controller 20 to bring the vehicle controller 20 into operation.

When the first switch SW1 and the second switch SW2 are turned on, the main power path is put into conduction. The main power path may be a closed loop passing through the battery pack 10, the first switch SW1, the second switch SW2, the third node N3, the electric motor 40, and the second node N2. When the main power path is put into conduction, the power is supplied from the battery pack 10 to the electric motor 40 to bring the electric motor 40 into operation.

The vehicle communication unit 30 may transmit a power off signal to the battery communication unit 110 in response to receiving a drive stop signal from the driver. The battery communication unit 110 may transmit the power off signal to the control unit 170. The control unit 170 may turn off the second switch SW2 and the first switch SW1 in that order in response to receiving the power off signal while the electric vehicle 1 is driving.

Figure 2:
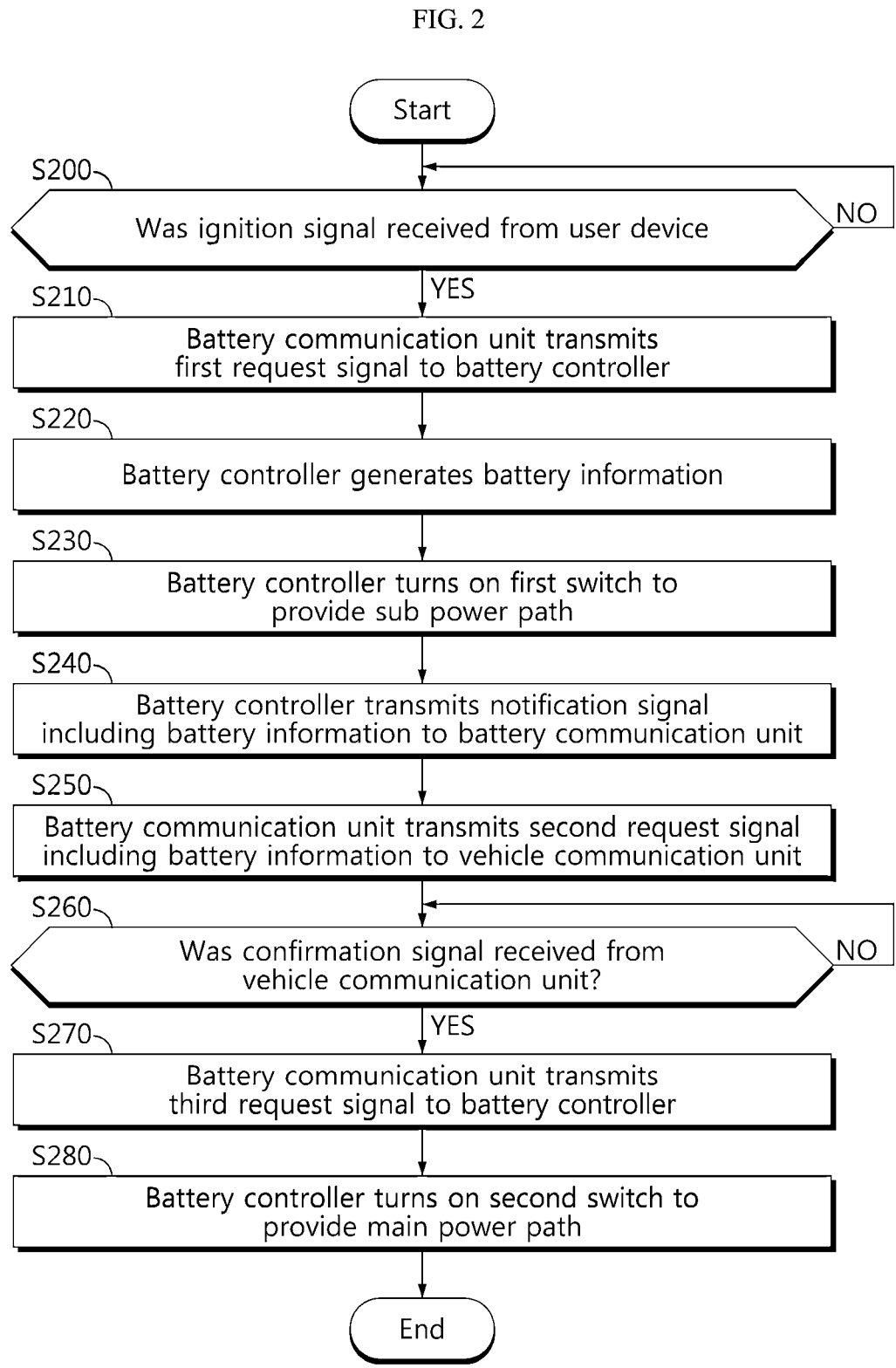
FIG. 2 illustrates by way of example a flowchart of a battery control method according to a first embodiment of the present disclosure.

FIG. 2 illustrates by way of example a flowchart of a battery control method according to a first embodiment of the present disclosure. The battery control method of FIG. 2 may be repeated in a predetermined cycle in the turn-off state of the first switch SW1 and the second switch SW2.

Referring to FIGS. 1 and 2, in step S200, the battery communication unit 110 determines whether an ignition signal was received. The ignition signal may be transmitted from the driver's user device 2. The user device 2 may be, for example, a smartphone capable of near field communication. When the driver inputs a driving request to the user device 2, and then the user device 2 moves into the communication range of the battery communication unit 110, the ignition signal may be transmitted from the user device 2 to the battery communication unit 110. When a value of the step S200 is "YES", step S210 is performed.

In the step S210, the battery communication unit 110 transmits a first request signal to the battery controller 130. The first request signal is a signal for changing the vehicle controller 20 from a disabled state to an enabled state.

In step S220, the battery controller 130 generates battery information in response to receiving the first request signal. The battery information may indicate at least one of voltage, temperature, or SOC of the battery pack 10 at the time when the first request signal was received.

In step S230, the battery controller 130 turns on the first switch SW1. By the turn-on of the first switch SW1, the sub power path between the battery pack 10 and the vehicle controller 20 is provided to change the vehicle controller 20 from the disabled state to the enabled state.

In step S240, the battery controller 130 transmits a notification signal including the battery information to the battery communication unit 110.

In step S250, the battery communication unit 110 transmits a second request signal including the battery information to the vehicle communication unit 30 in response to receiving the notification signal. The vehicle communication unit 30 transmits the second request signal to the vehicle controller 20. The vehicle controller 20 determines whether driving the electric vehicle 1 is possible or impossible based on the battery information of the second request signal. For example, when at least one of the voltage, temperature, or SOC of the battery pack 10 indicated by the battery information is an abnormal state (for example, overdischarged, overheated, overcooled) beyond a preset safety range, the vehicle controller 20 may determine that driving the electric vehicle 1 is impossible, and in other cases, the vehicle controller 20 may determine that driving the electric vehicle 1 is possible. When it is determined that driving the electric vehicle 1 is possible, the vehicle controller 20 transmits a confirmation signal the battery communication unit 110 through the vehicle communication unit 30. That is, the confirmation signal indicates that the battery pack 10 is in a sufficiently normal state to drive the electric vehicle 1.

In step S260, the battery communication unit 110 determines whether the confirmation signal from the vehicle communication unit 30 was received. When a value of the step S260 is "YES", step S270 is performed.

In the step S270, the battery communication unit 110 transmits a third request signal to the battery controller 130. The third request signal is a signal for changing the electric motor 40 from the disabled state to the enabled state.

In step S280, the battery controller 130 turns on the second switch SW2 in response to receiving the third request signal. By the turn-on of the second switch SW2, the main power path between the battery pack 10 and the electric motor 40 is provided to change the electric motor 40 from the disabled state to the enabled state.

Figure 3:
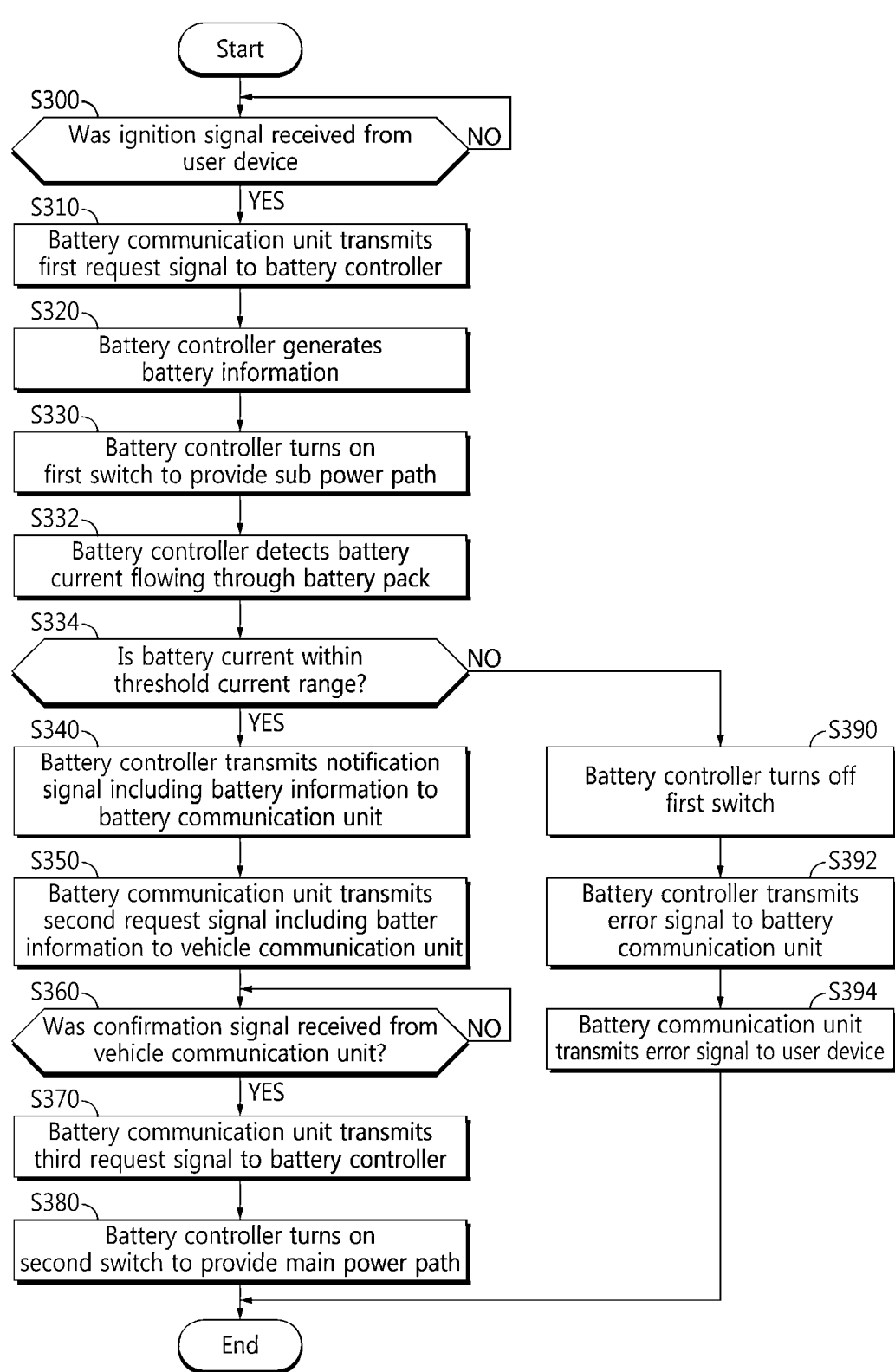
FIG. 3 illustrates by way of example a flowchart of a battery control method according to a second embodiment of the present disclosure.

FIG. 3 illustrates by way of example a flowchart of a battery control method according to a second embodiment of the present disclosure. The battery control method of FIG. 3 may be repeated in a predetermined cycle in the turn-off state of the first switch SW1 and the second switch SW2.

Referring to FIGS. 1 and 3, in step S300, the battery communication unit 110 determines whether an ignition signal was received. The ignition signal may be transmitted from the driver's user device 2. The user device 2 may be, for example, a smartphone capable of near field communication. When the driver inputs a driving request to the user device 2, and then the user device 2 moves into the communication range of the battery communication unit 110, the ignition signal may be transmitted from the user device 2 to the battery communication unit 110. When a value of the step S300 is "YES", step S310 is performed.

In the step S310, the battery communication unit 110 transmits a first request signal to the battery controller 130. The first request signal is a signal for changing the vehicle controller 20 from the disabled state to the enabled state.

In step S320, the battery controller 130 generates battery information in response to receiving the first request signal. The battery information may indicate at least one of the battery voltage, the battery temperature or the SOC of the battery pack 10 at the time when the first request signal is received.

In step S330, the battery controller 130 turns on the first switch SW1. By the turn-on of the first switch SW1, the sub power path between the battery pack 10 and the vehicle controller 20 is provided to change the vehicle controller 20 from the disabled state to the enabled state.

In step S332, the battery controller 130 detects the battery current flowing through the battery pack 10. Alternatively, in step S332, the battery controller 130 may detect the battery current and the battery voltage.

In step S334, the battery controller 130 determines whether the battery current is within a predetermined threshold current range. Alternatively, in step S334, the battery controller 130 may determine (i) whether the battery current is within the predetermined threshold current range and (ii) whether a voltage difference between the battery voltage of the battery information generated in the step S320 and the battery voltage detected in the step S332 is within a predetermined threshold voltage range. When a value of the step S334 is "YES", step S340 is performed. When the value of the step S334 is "NO", step S390 is performed.

In the step S340, the battery controller 130 transmits a notification signal including battery information to the battery communication unit 110.

In step S350, the battery communication unit 110 transmits a second request signal including the battery information to the vehicle communication unit 30 in response to receiving the notification signal. The vehicle communication unit 30 transmits the second request signal to the vehicle controller 20. The vehicle controller 20 determines whether driving the electric vehicle 1 is possible or impossible based on the battery information of the second request signal. For example, when at least one of the voltage, temperature, or SOC of the battery pack 10 indicated by the battery information is in an abnormal state (for example, overdischarged, overheated) beyond a preset safety range, the vehicle controller 20 may determine that driving the electric vehicle 1 is impossible, and in other cases, the vehicle controller 20 may determine that driving the electric vehicle 1 is possible. When it is determined that driving the electric vehicle 1 is possible, the vehicle controller 20 transmits a confirmation signal to the battery communication unit 110 through the vehicle communication unit 30.

In step S360, the battery communication unit 110 determines whether a confirmation signal from the vehicle communication unit 30 was received. When a value of the step S360 is "YES", step S370 is performed.

In the step S370, the battery communication unit 110 transmits a third request signal to the battery controller 130. The third request signal is a signal for changing the electric motor 40 from the disabled state to the enabled state.

In step S380, the battery controller 130 turns on the second switch SW2 in response to receiving the third request signal. By the turn-on of the second switch SW2, the main power path between the battery pack 10 and the electric motor 40 is provided to change the electric motor 40 from the disabled state to the enabled state.

In the step S390, the battery controller 130 turns off the first switch SW1.

In step S392, the battery controller 130 transmits an error signal to the battery communication unit 110. The error signal indicates that an open circuit fault or a short circuit fault occurred in the sub power path.

In step S394, the battery communication unit 110 transmits the error signal to the user device 2.

The embodiments of the present disclosure described hereinabove are not implemented only through the apparatus and method, and may be implemented through programs that perform functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto, and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. A battery control system for an electric vehicle including a vehicle controller connected between a first node and a second node, a vehicle communicator operably coupled to the vehicle controller, an electric motor connected between the second node and a third node, and a battery pack connected between a fourth node and the second node, the battery control system comprising:
   a battery communicator configured to transmit a first request signal in response to an ignition signal for the electric vehicle;
   a first switch connected between the first node and the fourth node;
   a second switch connected between the first node and the third node; and
   a battery controller configured to turn on the first switch to provide a sub power path between the battery pack and the vehicle controller and transmit a notification signal including battery information of the battery pack, in response to the first request signal, if both the first switch and the second switch are turned off,

wherein the battery communicator is further configured to transmit a second request signal including the battery information to the vehicle communicator in response to the notification signal.

2. The battery control system according to claim 1, wherein the battery communicator is coupled to the vehicle communicator through a near field communication channel.

3. The battery control system according to claim 1, wherein the battery information indicates at least one of a voltage, a temperature, or a state of charge of the battery pack at a point in time when the first request signal is received by the battery controller.

4. The battery control system according to claim 1, wherein the battery communicator is further configured to transmit a third request signal to the battery controller in response to a confirmation signal from the vehicle communicator after the second request signal is transmitted.

5. The battery control system according to claim 4, wherein the battery controller is further configured to turn on the second switch to provide a main power path from the battery pack to the electric motor in response to the third request signal.

6. The battery control system according to claim 1, wherein the battery controller is further configured to detect a battery current flowing through the battery pack after the first switch is turned on.

7. The battery control system according to claim 6, wherein the battery controller is further configured to transmit the notification signal to the vehicle communicator if the battery current is within a predetermined threshold current range.

8. The battery control system according to claim 6, wherein the battery controller is further configured to turn off the first switch if the battery current is outside of a predetermined threshold current range.

9. The battery control system according to claim 6, wherein the battery controller is further configured to transmit an error signal to the battery communicator if the battery current is outside of a predetermined threshold current range, the error signal indicating that an open circuit fault or a short circuit fault occurred in the sub power path.

10. An electric vehicle comprising the battery control system according to claim 1.

11. A battery control method for an electric vehicle including a vehicle controller connected between a first node and a second node, a vehicle communicator operably coupled to the vehicle controller, an electric motor connected between the second node and a third node, and a battery pack connected between a fourth node and the second node, the battery control method comprising:
   transmitting the first request signal in response to an ignition signal for the electric vehicle;
   if both a first switch connected between the first node and the fourth node and a second switch connected between the first node and the third node are turned off, turning on the first switch to provide a sub power path between the battery pack and the vehicle controller in response to the first request signal;
   transmitting a notification signal including battery information of the battery pack after the first switch is turned on; and
   transmitting a second request signal including the battery information to the vehicle communicator in response to the notification signal.

12. The battery control method according to claim 11, further comprising:

transmitting a third request signal to the battery controller in response to a confirmation signal from the vehicle communicator after the second request signal is transmitted; and turning on the second switch to provide a main power path from the battery pack to the electric motor in response to the third request signal.

13. The battery control method according to claim 11, further comprising:

detecting a battery current flowing through the battery pack after the first switch is turned on.

14. The battery control method according to claim 13, wherein the transmitting of the notification signal includes transmitting the notification signal to the vehicle communicator if the battery current is within a predetermined threshold current range.

15. The battery control method according to claim 13, further comprising:

turning off the first switch if the battery current is outside of a predetermined threshold current range.

16. The battery control method according to claim 13, further comprising:

transmitting an error signal to the battery communicator if the battery current is outside of a predetermined threshold current range, the error signal indicating that an open circuit fault or a short circuit fault occurred in the sub power path.

* * * * *